March 27, 1951 H. A. HOWELL 2,546,927

POLARIZING HEAD FOR MAGNETIC RECORDERS

Filed Sept. 13, 1947

Inventor
HUGH A. HOWELL by The Firm of Charles W. Hills Attys.

Patented Mar. 27, 1951 2,546,927

UNITED STATES PATENT OFFICE 2,546,927

POLARIZING HEAD FOR MAGNETIC RECORDERS

Hugh A. Howell, Valparaiso, Ind., assignor to The Indiana Steel Products Company, Chicago, Ill., a corporation of Indiana Application September 13, 1947, Serial No. 773,891

10 Claims. (Cl. 179—100.2)

This invention relates to a magnetic recording method and means, and more particularly, to a novel method and means in which the magnetic record member is passed successively through two saturating or polarizing magnetic fields which are located substantially at right angles with respect to each other, and then over a recording head having a predetermined orientation with respect to the last saturating or polarizing field.

In any magnetic recording apparatus, it is desirable to remove any previous recordings which may have been made on a magnetic record member, as well as to remove the effects of any stray magnetic fields to which the record member may have been subjected and to restore the record member to a uniform magnetic level.

It has been found that a particularly effective technique for recording may be had by first longitudinally polarizing the magnetic record member, preferably to a state of substantial saturation, and then passing the record member through a second polarizing magnetic field which is substantially at right angles to the first field. The second field should, also, preferably be of sufficient strength so as to substantially saturate the magnetic record member.

The record member in this state is then preferably passed over the recording head, the recording head being arranged to longitudinally magnetize the record member in accordance with the signal to be recorded.

One of the principal features and objects of the present invention is to provide a novel method and means for conditioning a record member, and for thereafter making a magnetic recording thereon.

A further object of the present invention is to provide a novel method for conditioning a record member prior to a recording operation.

Another object of the present invention is to provide a novel magnetic erase head for a magnetic recording device.

A further object of the present invention is to provide an erase head in which a single permanent magnet is arranged to produce two saturating fields located substantially at right angles to each other.

The novel features which I believe to be characteristic of my invention are set forth with particularity in the appended claims. My invention itself, however, both as to its manner of construction and method of operation, together with further objects and advantages thereof, may best be understood by reference to the following description taken in connection with the accompanying drawing, in which:

Figures 1, 2, 3:
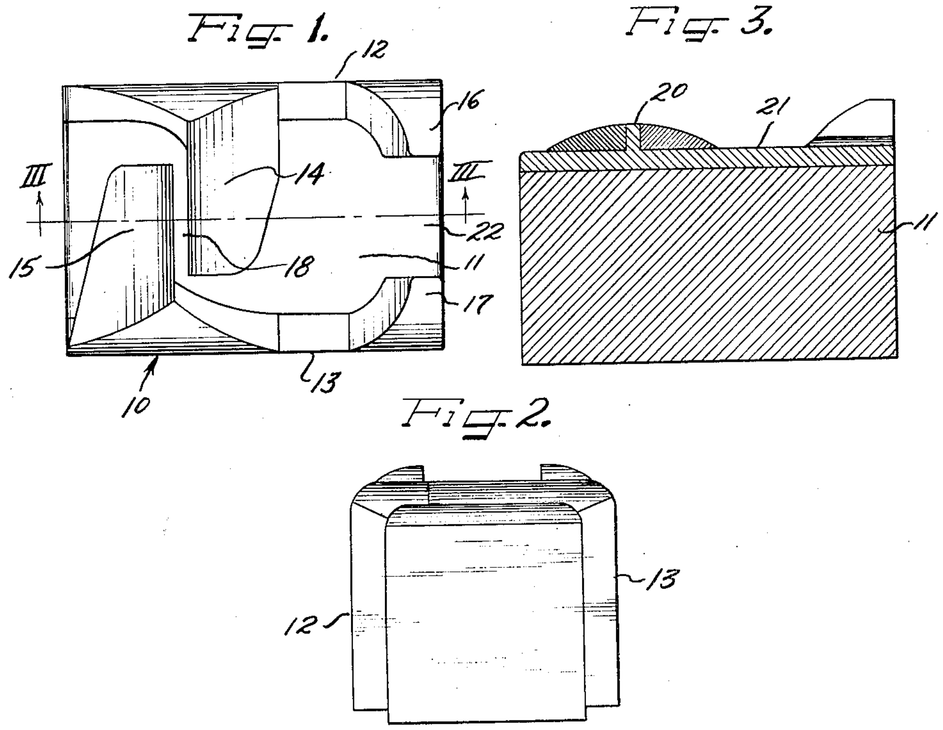
Figure 1 is a plan view of a magnetic erase head embodying the novel teachings and principles of the present invention.
Figure 2 is an elevational view of the left end of the magnetic erase head shown in Figure 1 of the drawing.
Figure 3 is a vertical sectional view taken along the line III—III of Figure 1.

In considering the illustrated embodiment of the present invention, let us consider first the erasing head which is illustrated in detail in Figures 1 to 3 of the drawing. More particularly, the magnetic erase head 10 includes a permanent magnet 11 which is mounted between two plate members 12 and 13, the direction of polarization of the permanent magnet 11 being such that the ends of the magnet are in contact with the plate members 12 and 13.

These plate members 12 and 13 are formed of a relatively high permeability material, and are bent over at their tops as is clearly shown in Figure 1 of the drawing to provide a pair of poles 14 and 15 and a second pair of poles 16 and 17.

From an inspection of Figure 1 of the drawing, it will be seen that the poles 14 and 15, which are formed from tongues bent down from the plate members 12 and 13, are so arranged as to extend the greater part of the distance across the magnet block 11, as well as to lie side by side in slightly spaced relationship to form a longitudinal magnetizing gap 18. The poles 16 and 17 are formed from relatively short tongues bent down from the plates 12 and 13 to form a gap therebetween substantially the width of the record member 19 (see Figure 4).

Figure 4:
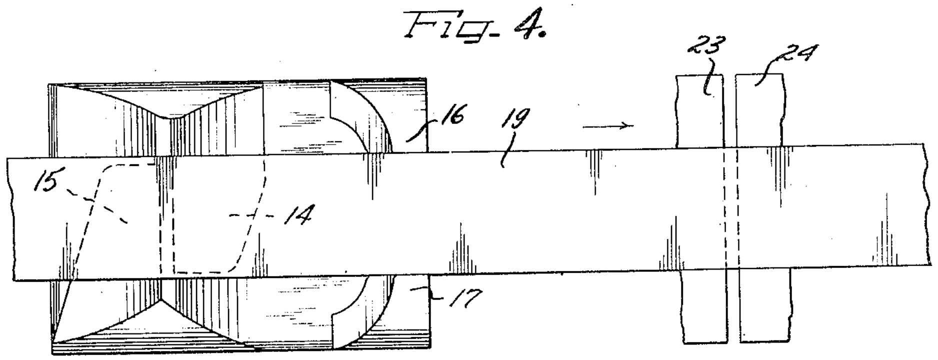
Figure 4 is a view showing the erase head of Figure 1, together with the ends of the two confronting poles of a recording head with a record member passing over both.

It will also be apparent from an inspection of Figures 2 and 3 of the drawing that the short tongues forming the poles 16 and 17 lie in a higher plane than do the long tongues forming the poles 14 and 15; for as will be seen from Figures 2 and 4 of the drawing, the record member 19, in the form of a tape, is arranged to pass over the poles 14 and 15, but between the poles 16 and 17.

In order to keep dust and other foreign particles out of the poles, a non-magnetic filler such as solder is filled in between the poles 14 and 15 as at 20 and over the upper surface of the permanent magnet as at 21. The solder provides a smooth non-abrasive surface over which the record member 15 rides as it first passes across the gap 18 between the poles 14 and 15 and then through the gap 22 between the poles 16 and 17.

It will be observed that since the plate member 12 is in contact with one end of the permanent magnet 11, poles 14 and 16 will be of one polarity (such, for example, as north), while the poles 15 and 17 which project from the plate 13 will be of the opposite polarity (such, for example, as south).

As is clearly shown in Figure 4 of the drawing, the magnetic record member 19 is arranged to pass successively over the gap between the poles 14 and 15 and then through the gap between the poles 16 and 17, after which it passes across the poles 23 and 24 of a magnetic recording head. The poles 23 and 24 (the ends only of which are shown) are so spaced as to longitudinally magnetize the record member 19 with the signal to be recorded as the record member 19 passes thereover.

The erase head 10 first saturates the record member 19 in a longitudinal direction. In this arrangement, the poles setting up the longitudinal saturating field are relatively close together and provide a high flux density in the gap.

The record member 19 thereafter passes between the poles 16 and 17 which transversely polarize the record member 19. Since the recording head is arranged for longitudinal magnetization, a transverse polarizing field has substantially the same effect as though the tape were completely demagnetized, for the only polarizing components which have any effect on the recording process are the longitudinal components of any polarizing field.

It has been found in practice that particularly effective erasing can be accomplished in the manner described above for the transverse polarizing field substantially removes the longitudinal recordings made by the longitudinal saturating field. It has further been found in practice that it is much easier to transversely polarize a uniformly longitudinally magnetized record member than it is to transversely polarize one having random or variable magnetizations thereon. Indeed, it has been found that when longitudinal recordings are made following an erasing operation carried out in the above described manner, that the results are substantially as good as when a completely demagnetized tape is used.

While I have shown a particular embodiment of my invention and described a particular method of operation, it will, of course, be understood that I do not wish to be limited thereto, since many modifications may be made, and I, therefore, contemplate by the appended claims to cover all such modifications as fall within the true spirit and scope of my invention.

I claim as my invention:

1. A polarizing head for magnetic recorders comprising a single permanent magnet having two pairs of complementary pole extension members, one pair on each of the opposite poles of the magnet, the component members of one pair being closely spaced together and the component members of said other pair being spaced relatively far apart.

2. A polarizing head for magnetic recorders comprising a single permanent magnet having two pairs of complementary pole extension members spaced from each other at opposite ends of said magnet, the component members of one pair being closely spaced together and the component members of said other pair being spaced relatively far apart, the axis of orientation of one pair of complementary pole members being substantially at right angles to the axis of orientation of said other pair of complementary pole members.

3. A polarizing head for magnetic recorders comprising a single permanent magnet, a pair of end plates in abutting relation to the polarized ends of said permanent magnet, said end plates being of relatively high permeability, low coercive force material, each of said end plates having two pole portions projecting toward the two pole portions of the other, thereby to provide two pairs of complementary magnetic poles, one pair of pole portions being in overlapping spaced relationship to each other and the other pair of complementary poles being in spaced confronting relationship defining a gap perpendicularly transverse to the direction of projection of said pole portions as well as the depth thereof.

4. A polarizing head for magnetic recorders comprising a single permanent magnet, a pair of end plates of magnetic material disposed opposite the polarized ends of said permanent magnet, each plate having a long tongue and a short tongue along its upper edge, said long tongues extending substantially over the top of said permanent magnet in overlapping spaced relationship to each other, thereby to establish a concentrated magnetic field having a magnetic axis substantially at right angles to the magnetic axis of said permanent magnet, and said short tongues extending toward each other forming a gap between them which is parallel to both the width and thickness dimensions defining said short tongues, thereby to establish a second magnetic field having a magnetic axis substantially parallel to the magnetic axis of said permanent magnet.

5. A polarizing head for magnetic recorders comprising a single permanent magnet, a pair of end plates of magnetic material disposed opposite the polarized ends of said permanent magnet, each plate having a long tongue and a short tongue along its upper edge, said long tongues extending substantially over the top of said permanent magnet and in overlapping spaced relationship to each other, thereby to establish a concentrated magnetic field having a magnetic axis substantially at right angles to the magnetic axis of said permanent magnet, and said short tongues extending toward each other, thereby to establish a second magnetic field having a magnetic axis substantially parallel to the magnetic axis of said permanent magnet, said long tongues and said short tongues being positioned with respect to each other in a manner to enable a magnetic record member to pass successively through these two magnetic fields.

6. A polarizing head for magnetic recorders comprising a single straight bar permanent magnet, a pair of end plates in abutting relation to the polarized ends of said permanent magnet, said end plates being of relatively high permeability, low coercive force material, each of said end plates having two pole portions, one of each of said pole portions being disposed in closer proximity to one side of said permanent magnet than the other of said pole portions, the pole portions on each end of said end plates close to said one side projecting toward each other and the remaining pole portions on each of said end plates also projecting toward each other.

7. A polarizing head for magnetic recorders comprising a single permanent magnet, a pair of end plates in abutting relation to the polarized ends of said permanent magnet, said end plates being of relatively high permeability, low coercive force material, each of said end plates having two pole portions, one of each of said pole portions being disposed in closer proximity to one side of said permanent magnet than the other of said pole portions, the pole portions on each of said end plates closest to said one side projecting toward each other and the remaining pole portions on each of said end plates also projecting toward each other, thereby to provide two pairs of complementary magnetic poles, the axis of orientation of one pair of complementary poles being at an angle to the axis of orientation of the other of said pairs of complementary poles.

8. A polarizing head for magnetic recorders comprising a single permanent magnet, a pair of end plates in abutting relation to the polarized ends of said permanent magnet, said end plates being of relatively high permeability and low coercive force material, each of said end plates having two pole portions, one of each of said pole portions being disposed in closer proximity to one side of said permanent magnet than the other of said pole portions, the pole portions of said end plates closest to said one side projecting toward each other and the remaining pole portions on each of said end plates also projecting toward each other, thereby to provide two pairs of complementary magnetic poles, the axis of orientation of one pair of complementary poles being substantially at a right angle to the axis of orientation of the other of said pairs of complementary poles.

9. A permanent magnet assembly comprising a single permanent magnet, two end plates in abutting relation to the polarized ends of said permanent magnet, each of said end plates having two pole portions projecting in side by side relation over a side of said magnet toward the pole portion on the corresponding side of the other plate, thereby to provide two pairs of complementary magnetic poles, the axis of orientation of one pair of complementary poles being at an angle to the axis of orientation of the other of said pairs of complementary poles.

10. A permanent magnet assembly comprising a single permanent magnet, two end plates in abutting relation to the polarized ends of said permanent magnet, each of said end plates having two pole portions projecting in side by side relation over one surface of said permanent magnet toward the pole portions of the other plate, thereby to provide two pairs of complementary magnetic poles, said pole portions being disposed in relatively close proximity to said magnet surface but spaced therefrom, one pair of said complementary pole portions having an axis of orientation angularly disposed with relation to the axis of orientation of the other pair of complementary poles.

HUGH A. HOWELL.

REFERENCES CITED

The following references are of record in the file of this patent:

UNITED STATES PATENTS

| Number | Name | Date |
|---|---|---|
| 1,645,139 | Harrison | Oct. 11, 1927 |
| 1,674,539 | Albertus | June 19, 1928 |
| 1,711,776 | Conwell | May 7, 1929 |
| 1,773,082 | Harrison | Aug. 12, 1930 |
| 1,997,193 | Kato | Apr. 9, 1935 |
| 2,241,105 | Woodruff | May 6, 1941 |
| 2,269,149 | Edgar | Jan. 6, 1942 |
| 2,307,205 | Ewald | Jan. 5, 1943 |
| 2,350,083 | Walker | May 30, 1944 |
| 2,380,560 | Urquhart | July 31, 1945 |
| 2,388,683 | Frickey | Nov. 13, 1945 |
| 2,428,449 | Camras | Oct. 7, 1947 |

FOREIGN PATENTS

| Number | Country | Date |
|---|---|---|
| 213,091 | Great Britain | Mar. 27, 1924 |

OTHER REFERENCES

Permanent Magnets Have Four Major Jobs, C. A. Maynard, reprint from Electrical Engineering, Nov. 1944.